United States Patent [19]

Pavonet

[11] 4,176,160

[45] Nov. 27, 1979

[54] PROCESS FOR PURIFYING A ZINC SULFATE SOLUTION

[75] Inventor: Engelhard Pavonet, Chockier, Belgium

[73] Assignee: Societe de Prayon, Belgium

[21] Appl. No.: 883,451

[22] Filed: Mar. 6, 1978

Related U.S. Application Data

[63] Continuation-in-part of Ser. No. 500,598, Aug. 26, 1974, abandoned, which is a continuation of Ser. No. 264,563, Jun. 20, 1972, abandoned.

[30] Foreign Application Priority Data

Jun. 23, 1971 [BE] Belgium .................................. 104968

[51] Int. Cl.² .......................................................... C01G 9/06
[52] U.S. Cl. ........................................ 423/104; 423/544;
423/101; 423/106; 423/144; 423/146; 423/109;
423/35; 423/36; 210/79; 210/81; 210/83;
210/330
[58] Field of Search ............... 423/101, 106, 104, 144,
423/145, 146, 147, 544, 633, 27, 34, 41; 75/120;
210/DIG. 12, 350, 79, 81, 83, 45, 57

[56] References Cited

U.S. PATENT DOCUMENTS

| | | | |
|---|---|---|---|
| 1,834,960 | 12/1931 | Mitchell | 423/101 |
| 1,973,295 | 9/1934 | Myhren | 423/106 |
| 2,754,174 | 7/1956 | Roberts | 423/101 |
| 2,772,230 | 11/1956 | Hollander | 423/101 |
| 3,781,405 | 12/1973 | Allan et al. | 423/109 |
| 4,013,754 | 3/1977 | Stauter et al. | 423/27 |

FOREIGN PATENT DOCUMENTS

| | | | |
|---|---|---|---|
| 768906 | 11/1971 | Belgium | 423/109 |
| 52-32327 | 8/1977 | Japan | 423/106 |

*Primary Examiner*—Herbert T. Carter
*Attorney, Agent, or Firm*—McGlew and Tuttle

[57] ABSTRACT

Process for purifying an iron containing zinc sulfate solution which comprises precipitating iron from said solution as a slurry in at least one of the following forms at a pH which is maintained lower than 4: basic sulfate, jarosite or goethite; filtering said slurry on a planar horizontal filter and forming a cake on said planar filter; washing the cake directly on the planar filter with water supplied onto the cake without forming a newslurry with washing water and thus freeing the cake from water soluble zinc and copper compounds promptly before hydrolysis thereof insolubilizes said compounds as basic sulfates, whereby the solid residue in the cake does not contain substantially more insoluble zinc content than it contained in the slurry being fed to the filtration.

16 Claims, 6 Drawing Figures

*Diagram for Choice of Filter Types According to Grain Sizes*

(Jarosite curve at limit between drum or disc filters and pressure filters)

PROCESS FOR PURIFYING A ZINC SULFATE SOLUTION

CROSS REFERENCE TO RELATED APPLICATIONS

This application is a continuation-in-part of copending application Ser. No. 500,598, filed Aug. 26, 1974, which in turn is a continuation of application Ser. No. 264,563 filed June 20, 1972 both now abandoned.

This invention relates to an improvement in a process for purifying an iron-containing zinc sulfate solution, this process comprising the successive steps of precipitation of said iron at a pH lower than 4, as one of the following forms: basic sulfate, jarosite or goethite, settling the resulting slurry and filtering the underflow issuing from said setting.

The term "underflow" is used in this present specification as meaning the thickened but still relatively fluid slurry which is formed in the lower portion of the settler and is removed therefrom, separately from the decanted solution of the top portion which is removed as "overflow".

In known hydrometallurgical processes for manufacturing zinc by electrodeposition from iron bearing zinc ores, zinc sulfate solutions are prepared by leaching roasted zinc ore with sulfuric acid. This operation will be called "primary leaching". In one step of this primary leaching the solution obtained is brought to a pH of 4–5.5 by reaction with an excess of roasted zinc ore. There is then obtained, after settling and/or filtration, a zinc sulfate solution containing only a negligible amount of iron, which solution will be used, after some purifications, for the electrodeposition of zinc, and a residue of solids containing substantially all of the iron, together with a still important part of the zinc and some of the copper contained in the roasted ore treated.

Most of these zinc and copper can be recovered by a further leaching of this residue (which will be called secondary leaching), by sulfuric acid within more drastic conditions of temperature and concentration, whereby also most of the iron is dissolved, and thereafter precipitating this iron and separating the precipitate, so leaving a zinc and copper sulfate solution with only a small amount of iron. This solution is then recycled to the above mentioned leaching step at the pH of 4–5.5, whereafter substantially all of the zinc of the ore is in the solution separated from this step and directed towards the electrodeposition.

The said precipitation of iron has been a difficult problem, and considerable amounts of ferriferous zinc residues have been dumped, awaiting for the development of satisfactory retreatment processes.

Precipitates of iron in the forms of oxides and hydroxides, voluminous and very heavily hydrated, are not satisfactory as they are practically unfilterable, and include considerable amounts of zinc, which cannot be separated.

U.S. Pat. Nos. 2,754,174 and 2,772,230 have proposed an improvement in such precipitates, obtained by adding to the solution certain amounts of phosphoric or arsenate compounds, whereby the filtering rates, although still very low, are considerably improved. These methods suppose that the iron content of the solution is rather low and no industrial operation on the usual iron-bearing zinc ores has been possible.

Several processes have been proposed for separating the iron and the zinc of the solution obtained from the above said leaching of the iron-bearing zinc residue.

One known process of this kind (f.i. U.S. Pat. No. 3,434,798) comprises a leaching with sulfuric acid, which dissolves most or large portions of iron and zinc, separating the so obtained lead-bearing residue, and treating the solution by oxidation and neutralization to a pH of 1–4, so that the iron precipitates as basic iron sulfate.

In another known process of this kind, f.i. U.S. Pat. No. 3,652,264, the operation is similar, but is effected in presence of sufficient amount of alkaline ions (Na, K, $NH_4$), to precipitate complex compounds of basic iron sulfates of the typical kind $K Fe_3(SO_4) (OH)_6$ (potassium jarosite).

In yet another known process, f.i. U.S. Pat. No. 3,434,987, after the similar sulfuric leaching, the iron of the solution is reduced to the ferrous state by addition of crude blende, the lead-bearing solid residue is separated, then the iron of the remaining solution is, by the combined action of air or oxygen and of roasted zinc ore or other zinc oxides, precipitated as goethite [$FeO(OH)$], mixed with variable proportions of jarosites and basic sulfates.

All of said iron-bearing precipitates or residues which contain substantially all of the iron of the zinc ores used, except a small part left in the lead-bearing residue, are obtained at pH values which are low enough, lower than 4, to prevent the precipitation of the zinc and copper of the solution. Said pH must however be high enough to allow substantial elimination of the iron with concomitant precipitation of undesirable elements such as arsenic, antimony, tin and germanium.

Always in the application of any of the above mentioned processes, the iron precipitates or residues obtained still include, even after due washing, some appreciable amount of zinc, which sensibly effects the zinc recovery rate of the overal treatment, this zinc becoming even, in the most recent plants, by far the larger loss of zinc of this overal treatment.

of the known processes mentioned, the precipitates obtained as jarosites or goethite are the most suitable for separation by filtration and washing. Example has been taken from a hydrometallurgical zinc plant operating with the jarosite precipitation process, which has now emerged as the most usual process.

(A) the zone for horizontal planar vacuum filters (coarser material), (B) the zone for drum or disc vacuum filters (medium size material,)

(C) the zone for pressure and eventually precoated filters (f.i. filter presses) (finer size material).

This diagram, which is a guide for the choice of filters for specific materials has been published, a.o., by the magazine: "AUFBEREITUNGS TECHNIK n° 10 - 1970".

From those three diagrams, the practicians get the technical confirmation of the choice of the drum filter that they have made for the jarosite filtration, as soon as they had that material in hands, the same drum filters being also chosen for goethite and basic sulfates.

Drum filters are widely used in the hydrometallurgical industries of zinc, copper, and other metals for the separation of leaching residues and precipitates. As in most cases only a relatively small amount of wash water can be used for washing the cake formed on the drum filter itself, the practice has become standard to firstly filter the slurry and wash the cake with a certain amount of wash water in a first stage of drum filters in parallel, to collect the cakes therefrom, reslurry them, and filter again this new slurry on a second stage of drum filters with also a cake wash on these second filters by a second amount of wash water, a third amount of water being mixed with the slurry fed to the second stage filters, and the filtrates of the latter being reused for the above said reslurrying of the cakes of the first stage filters.

For materials which can be readily settled, it is the thickened slurry obtained by a prior settling which is submitted to filtration, thus reducing the filtering surface required, and this is the case of jarosite. It is further of common use to improve the settling ability of the slurries by adding some known coagulants.

Figure 5:
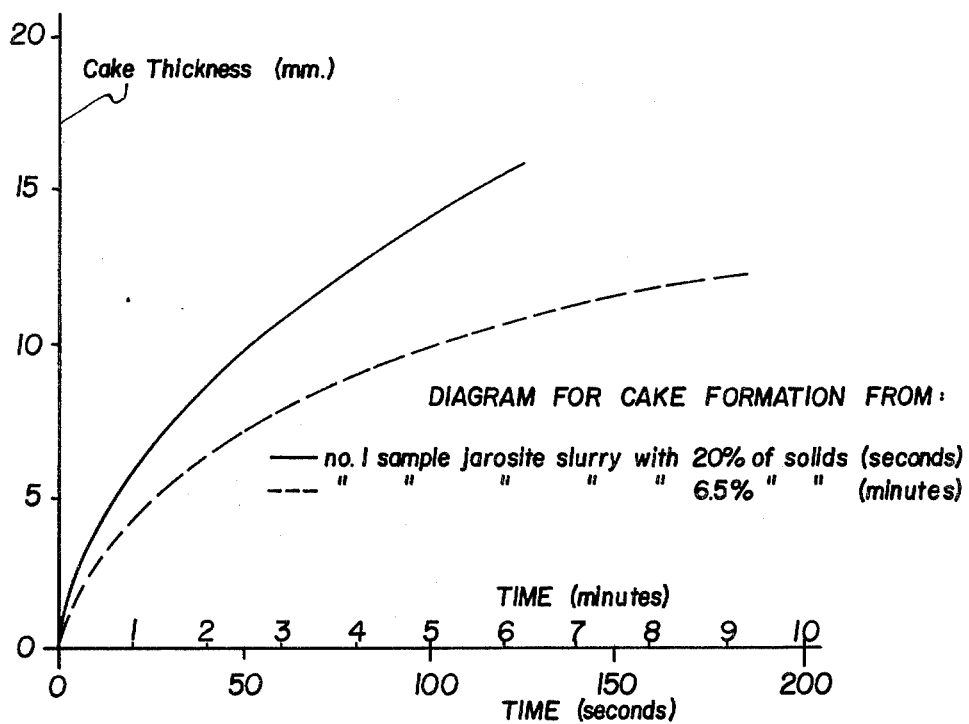

FIG. 5 is a diagram for cake formation of a sample of jarosite slurry.

Figure 6:
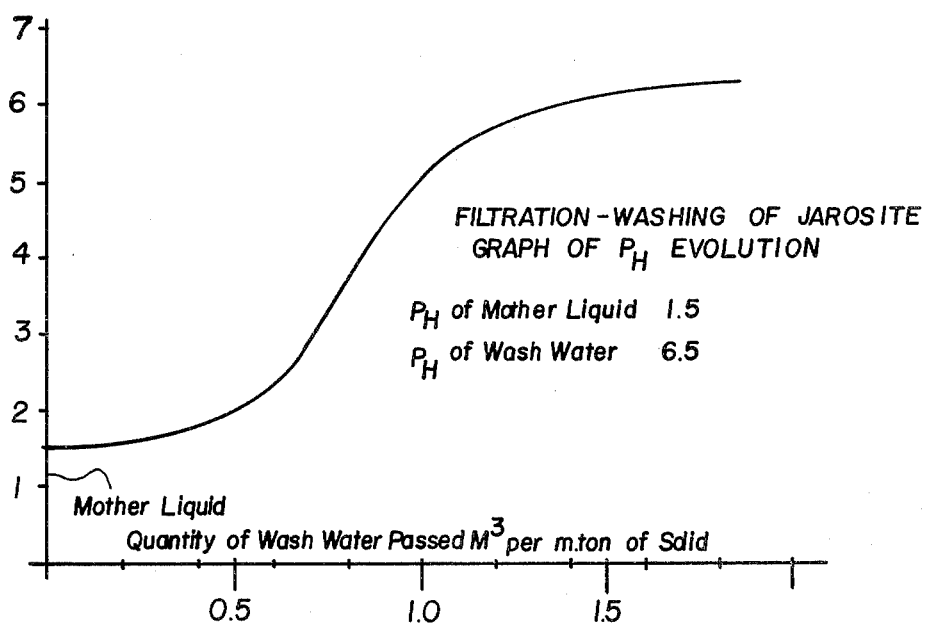

FIG. 6 shows a graph of typical filtration curves illustrating how pH changes in the wash water.

Typical results of a plant operating according to the above described method were as follows:

The operation was performed on two stages of vacuum drum-filters with an intermediate reslurrying and settling of the cake of the first stage prior to the feeding to the second stage.

The jarosite slurry obtained according to the above mentioned process, and issuing as underflow of a presettler, had the following composition:
solution: 160 g/l of zinc; 1 g/l of iron; 0.4 g/l of copper
pH: 2.5
solids: 350 to 400 g/l
This slurry was filtrated on first stage drum filters, the cakes of these drums being washed by a careful and fine spray of water onto the cake of the top part of the drums, to the maximum amount which could be absorbed by the cake without flowing down in the drum trough, i.e. 0.2 $m^3$ per metric ton of jarosite—The filtrates were recycled to the primary leaching as mentioned before.

The cake discharged with 40% of impregating liquid was reslurried with the filtrates of the second stage drum filters and the mixture settled.

The underflow was fed to the second stage drum filter. On the latter was sprayed, carefully and finely, a maximum wash water rate of 0.3 $m^3$ per metric ton of jarosite onto the cake of the top part of the drums (more water would flow down in the troughs). A third portion of wash water, 2 $m^3$ per metric ton of jarosite was mixed with the slurry prior to the second stage filtration. The filtrates of the latter were recycled to the intermediate reslurrying, whereas the cakes were discarded as waste material with the following typical composition:
Liquid in the cakes: 40%
Chemical analysis of the dried solids: 30% of iron; 12% of sulfur; 0.6% of water soluble zinc; 2.3% of water insoluble zinc; 0.2% of copper.

The total amount of wash water thus $0.2+0.3+2.0=2.5$ $m^3$ per ton of jarosite, and result of 0.6% of water soluble zinc corresponded to an average in current commercial operation wherein figures between 0.4 and 0.6% can be attained when the operations are carefully controlled and performed.

From the results of the industrial exploitation, it has to be concluded that the problem of filtrating the jarosite residue was definitely solved by the use of simple and cheap drum filters according to the so well established standard of the hydrometallurgical industrial practice.

However, there remained the rather high amount of 2.3% of water insoluble zinc, which obviously, could not be imputed to the filtration process. With the various improvements of the present commercial operations, this amount of zinc has become by far the highest zinc loss of the whole process: for a typical commercial operation, it reaches 1.25% of the zinc produced, and it is often higher.

Although, at first sight, this insoluble zinc could readily be ascribed to the undissolved part of the roasted ore used for the precipitation of jarosite, intensive research work was undertaken to find out how this happened precisely and it was astonishingly recognized that in the slurry before filtration, such amount of insoluble zinc did not exist and that it was produced during the successive operations of the standard separation with the two stages of drum filters.

It was concluded that the washing by mixing with water was causing a sensible hydrolysis of the zinc and copper sulfates in the impregnation liquid of the cake.

It was therefore tried out to effect the separation in a manner which would avoid or at least minimize the mixing of the liquor with the washing water. It was found that this could be substantially obtained by filtering the slurry on a horizontal plane, and just after emergence of the cake surface, by flooding the cake with a suitable amount of wash water, so that, a pressure differential being applied from above the cake and wash liquid to the space located below the horizontal filtering medium, the vertical action of this pressure differential, superimposed with the gravity force, gets the wash liquid mass to push the impregnation liquor before itself in the cake pores and expels it to below the filtering medium. This washing "by displacement" is a rapid operation, 2–5 or maximum 10 minutes for the material involved and for the cake thicknesses selected. Therefore the slight mixing of water and liquor molecules which occurs along the separation contact face between the pushing wash water and the impregnation liquor in the cake pores, or along the walls of the pores where liquor molecules are stripped from the cake particles surfaces, does not have time enough to produce, within the cake, the reaction of hydrolysis, one product of which is the insoluble zinc and copper sulfates. It does not matter whether any hydrolysis occurs in the filtrates outside the cake. What only matters is the zinc and copper which may be entrapped within the cake in an insoluble form.

According to the present invention there is therefore provided a process for purifying an iron-containing zinc sulfate solution comprising the consecutive steps of precipitating said iron at a pH lower than 4 as one or more of the following forms: basic sulfate, jarosite or goethite, settling the resulting slurry, filtering the underflow from this settling on a plane horizontal filtration surface, and washing the resulting filter cake with water on the same surface to free the cake from water-soluble zinc and copper compounds by displacement of the impregnation liquor in the cake, the wash water being flooded onto the cake surface and being forced through the cake pores by the combination of gravity and of the pressure-differential from above the cake to beneath the filtration surface, in such a way as to substantially avoid mixing of the wash water with the impregnating liquor and to substantially expel the latter from the cake within a short time, before any significant amount of insoluble zinc and copper sulfates can be formed by hydrolysis within the cake.

In order both to decrease the filtration surface necessary and to reduce the contact time of wash water within the cake, thin cakes must be used, maximum 15 mm and preferably 8 to 10 mm, minimum about 5 mm.

In order to get the straight stripping effect of the displacement of the impregnation liquor from the cake pores by the wash water, it is necessary that the liquid pressure of the water be sustained on the rear-guard of the liquor, until the latter has been completely expelled from the pores. In practice, this requires that the quantity of wash water be in excess of at least about 25% and preferably 50% to 100% or more of the volume of the liquor in the pores, or volume of voids in the cake. For the usual jarosite, this requires a wash water rate of at least about 1.1 m$^3$ and preferably 1.6 to 2.2 m$^3$ or more for each metric ton of solid material. The result still improves slightly up to a rate of 2.5 to 3 m$^3$ per ton of solid.

In relation with this wash rate, it must be pointed out that the quantity of water allowable into the whole hydrometallurgical process is limited, as an excess amount of water would finally dilute the zinc sulfate solution submitted to the electrodeposition, and this has to be avoided. The quantity practically acceptable may vary, according to the kind of ore processed between about 1 and 3 m$^3$ per ton solid.

Experimental vacuum filtration of the same slurry as that used in the double stage drum filtration described herein above was performed on a large horizontal filtering cell using the same amount of wash water, 2.5 m$^3$ per metric ton of solid, and the results were as follows:
Liquid in the cake: 40% (of the wet cake)
Composition of solids: 30% of iron; 12% of sulfur; 0.2% of water soluble zinc; 0.6% of water insoluble zinc; 0.05% of copper.

Whereas the lower water soluble zinc content of 0.2% (against 0.6% with drum filters) corresponds to what was expected, the important decrease of 2.3% to 0.6% of the water insoluble zinc can only be explained by the previously unknown existence of the zinc sulfate hydrolysis in the case of the drum-filters, which is avoided with the details of operation of the horizontal filter.

The operation conditions were as follows:
Slurry was poured on the filter at the rate of 8 Kg solids per square meter of filtering area.
A vacuum of 500 mm Hg was applied.
As soon as the cake surface emerged, 20 liters of wash water per square meter were gently poured onto the cake surface using a discharging brattice, so that the cake particles remain unaffected by the feed flow. Spray nozzles have also been used successfully for this operation, using a large number of sprays with finely divided gentle rain touching the supernatant wash liquid without disturbing the cake.

Through the combination of gravity and of the pressure differential between the atmosphere above the cake and the vacuum inside the filter, the wash liquid front percolates substantially vertically through the cake pores, chasing the impregnating liquor before itself. After the wash liquid has disappeared into the cake, draining by the vacuum is continued until the cake developes cracks by shrinkage, and the operation is then stopped and the cake discharged.

The cake is a viscous somewhat plastic and claylike material and its filtration rate is low. From this ensues the optimum cake thickness stated of 8-10 mm, minimum about 5 mm, maximum 12-15 mm. As the displacement washing must in this case occur as perfectly as possible, it is important that the filtering medium and filtration surface are as perfectly plane and horizontal as possible, in order to keep cakes of very even thickness and precisely plane and horizontal surface. The usual construction of horizontal filters is not accurately enough plane and horizontal and special manufacturing standards have to be practiced in order to have plane horizontal filtering surfaces within the tolerances of about 1 or 2 mm.

As example is displayed in the case of the rotary horizontal tipping pan filter. Special construction has to be provided for with devices which enable to adjust and keep well horizontal the rotary circular frame which bears the "tipping pans" or "invertible cells". Cell construction must be perfectly plane within about ±1-2 mm, and means must be included to adjust the horizontaliy radially and circumferentially within the same tolerance. Mechanical requirements for the other types of horizontal filters can be determined readily by the manufacturers in view of the process requirement.

When a small amount of wash water is allowable, although, of course, still higher than the minimum necessary for getting the displacement effect in the washing, it is advantageous to pass this small amount of water 2 to 3 times through the cake so as to effect a double or triple counter-current washing, the filtrate of each pass being the feed of the previous pass, upstream in the sequence of operations in relation with the cake.

It is important to operate with thin cakes in order to keep washing times as low as possible, within a normal range of say 1 to 5 minutes or at the most 10 minutes for each of the washes, which leads to total filtration and washing cycles of 5 to 20 minutes.

If the cake becomes very thin, less than about 5-6 mm, the regularity of percolation of the wash liquids is impaired by the unavoidable irregularity of the planeness and horizontality of the filtering surface, the quantity of wash liquid passing through any given pore is decreased and the wash results become worse. If, on the contrary, the cake becomes thicker, say more than 12-15 mm, although the displacement wash effect is improved, the filtration and wash cycle becomes too long, there is then some risk of slight hydrolysis and the size of the necessary filter becomes too large.

The profit of the operation with a plane horizontal filter amounts to $(0.6+2.3)-(0.2+0.6)=2.1\%$ of zinc content decrease in the wasted jarosite residue with 30% of iron, in the case of the examples displayed hereinbefore and, in commercial operation, it can frequently be higher.

Assuming a roasted ore having 56% of zinc and 12% of iron, this quantity of zinc recovered amounts to $$\frac{12 \times 2.1}{56 \times 30} = 0.015 = 1.5\%$$

of the zinc fed to the plant. The value of this saved zinc covers for the several times higher initial cost of a plane horizontal filter.

Such horizontal filters are described in the technical litterature for instance in:

Industrie und Technik + Maschinenwelt (Heft 1/1959—FIG. 5-7-8-9).

Whereas the better physical washing effect, reducing from 0.6% to 0.2% the soluble zinc content of the cake as compared with drum filter operation, must be expected according to the technical knowledge, the decrease of 2.3% to 0.6% of the insoluble zinc content, obtained only through the change in filtering and washing operation details, is unexpected and unknown in the technical world.

It is matter of course that higher insoluble zinc contents than 2.3% and 0.6% can be obtained in the cakes of the drum filters and of the horizontal filters respectively, as the real insoluble zinc content existing in the residue before the filtration can be much higher than 0.6%, this resulting from a less good reaction during the precipitation of iron. What is considered in the present patent application is the increase of such insoluble zinc content which is produced in the operation of drum filters and is substantially avoided through the operation as described of plane horizontal filters.

A review of the most usual filters used in the industrial practice is given in "MORGAN-GRAMPIAN'S" PROCESS ENGINEERING TECHNIQUE EVALUATION—FILTRATION—1969. On pages 40–48 are displayed vacuum filters and the following horizontal filters are considered:

(a)—single or multi-tipping pan filters;
(b)—horizontal linear tipping pan filters;
(c)—horizontal rotary tipping pan filters;
(d)—horizontal linear belt filters;
(e)—horizontal rotary table filters.

Batch filters like (a) are technically suitable for the practice of the invention, but continuous operation with the other filters will be chosen for economical reasons.

Rotary tipping pan filters will be preferred, because they have a series of individual filtering pans (or cells) which it is more easy and convenient to keep separately horizontal than to keep horizontal the whole area in the case of a filter with one continuous filtering area (d and e). Horizontal linear tipping pan filters are not generally used in the industrial practice.

The preferred choice of the rotary tipping pan filter is essentially based on the fact that its much higher initial cost is compensated, in a very few years, by the additional zinc recovery obtained, otherwise never would it have been considered, in view of the cheap cost of standard drum filters which give a reasonably good soluble zinc figure in the wasted cakes.

Figure 1:
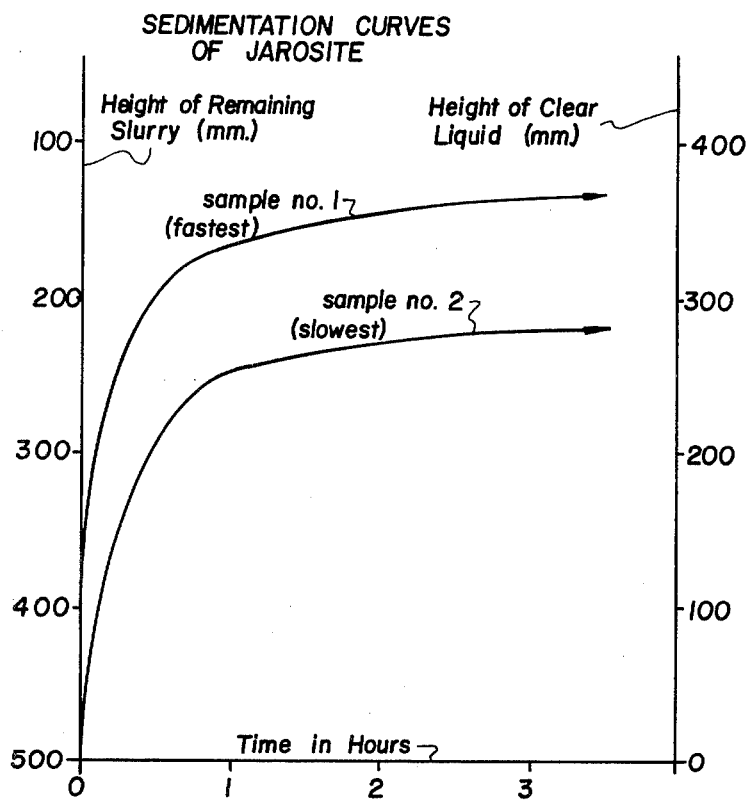
FIG. 1 shows two typical sedimentation curves of the jarosite slurry obtained by the neutralisation of the iron- and zinc sulfates solution (one with higher and one with lower sedimentation speed).
Figure 2:
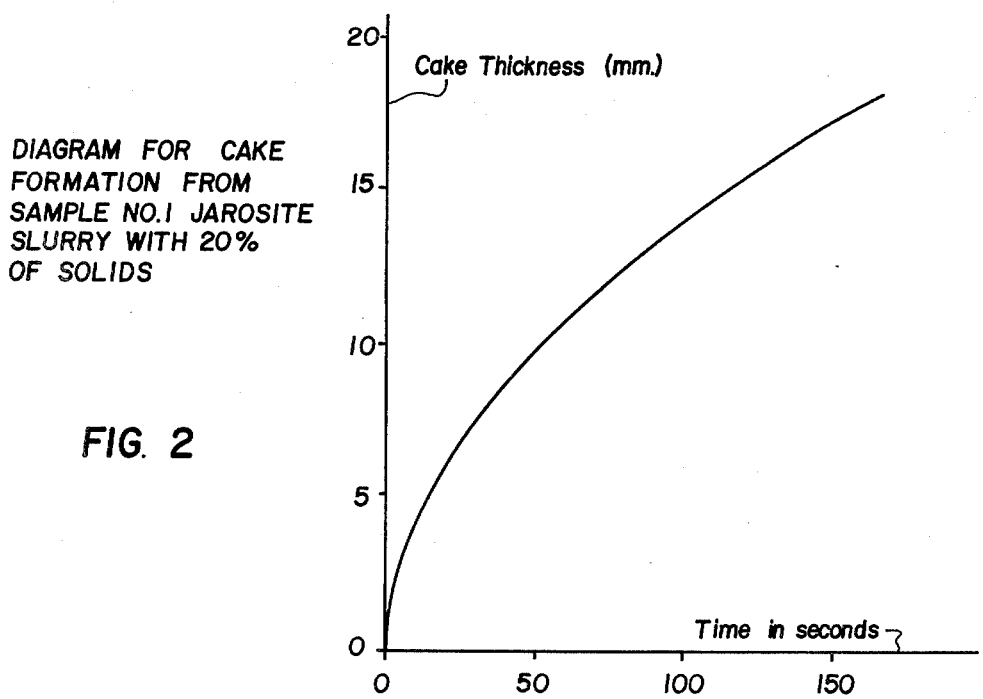
FIG. 2 shows a typical cake formation curve when filtering the thickened slurry, obtained in the underflow when submitting to settling said slurry with higher sedimentation speed.
Figure 3:
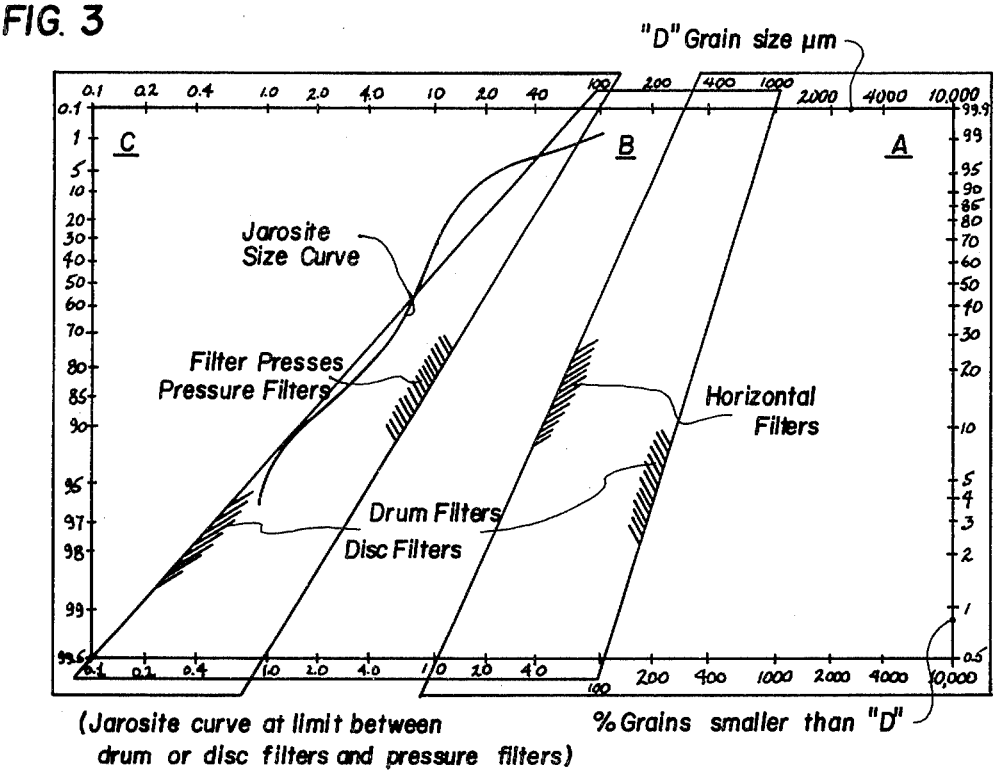
FIG. 3 shows the granulometric curve (size classification curve) of the jarosite residue plotted within a diagram divided in three zones.

A recent description of such a filter has been given in the West German OFFENLEGUNGSSCHRIFT No. 2,645,580 filed on the 8th Oct. 1976, which corresponds to patent application nr. 730657 in the U.S.A., filed on the 7th Oct. 1976, this description being displayed on pages 8 and 9, in relation with FIGS. 1, 2 and 3.

Such a filter essentially comprises a circular rotary carrying frame, a series of filtering cells fastened invertibly on the rotary frame, a central collecting distributor (or central valve), supporting rollers for the rotary frame, guides and devices for keeping the cells horizontal during the larger part of their revolution around the filter center axis, and for inverting them for cake discharge, a driving mechanism, connection means from cells to distributor, slurry and wash liquids feed devices, and a collecting means for the discharged cake. The various filtrates on their part, are tapped from the central distributor. On pages 20 to 23 therein is detailed a typical cell construction in conjunction with FIGS. 22 to 29.

Such horizontal tipping pan filters are normally used for thick cakes, f.i. 20 to 80 mm or more.

For the thin cakes of jarosite filtration, it is therefore necessary to manufacture the filter very carefully; to have filter medium bearing surfaces plane by less than 1 mm and to provide, in the filter, means for adjusting and keeping a precise horizontality of the filter medium in the cells within the required tolerance.

Figure 4:
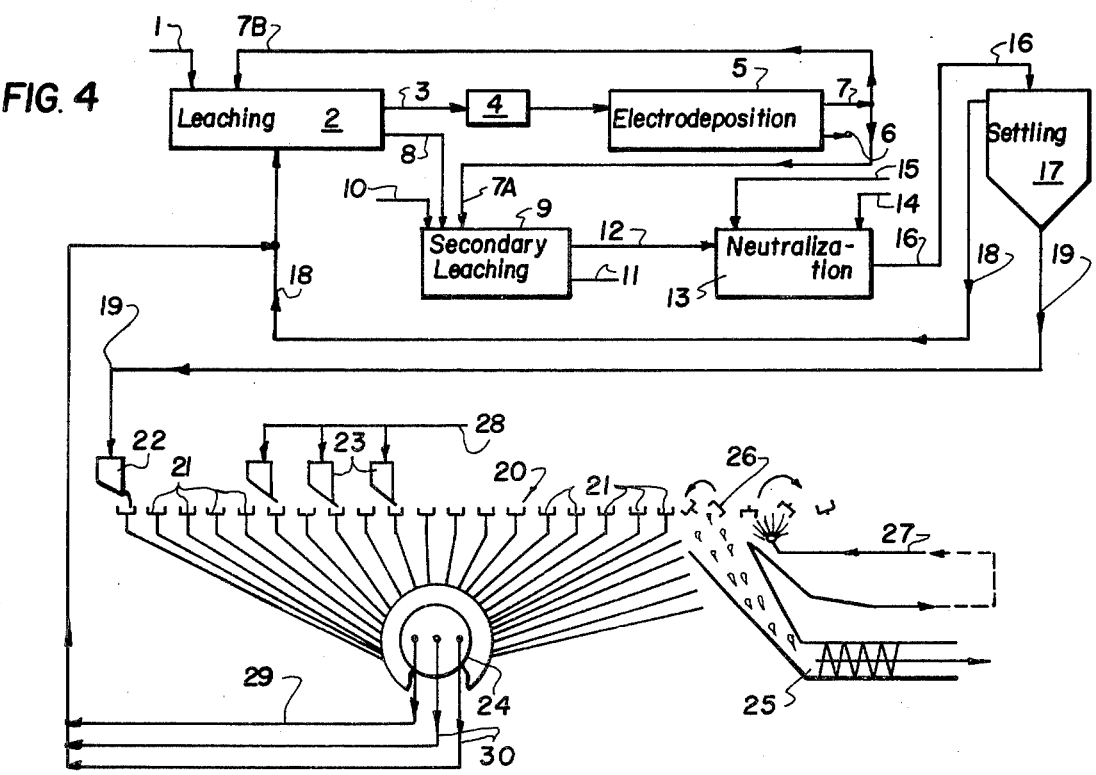

A simplified flow-sheet of the hydrometallurgical process including the filtration of a jarosite residue according to the present invention on such a horizontal rotary tipping pan filter is given on FIG. 4.

The roasted ferriferous zinc ore (1) is submitted in (2) to the primary leaching in accordance with any conventional process.

The solution (3) resulting therefrom, at a pH of 4–5.5., is purified in (4), and thereafter submitted in (5) to the electrodeposition of zinc (6), leaving a residual sulfuric acid and zinc sulfate solution (7), the whole according to conventional practice.

The leaching residue (8) is submitted to a secondary leaching (9) by part (7A) of the acidic solution (7) and a certain amount of fresh sulfuric acid (10), the balance (7B) of solution (7) being used for the primary leaching (2). The secondary leaching includes a separation step from which the final leaching residue (11) is discarded or used for further processing for recovery of lead and other valuable undissolved metals.

The solution (12) separated from the secondary leaching is submitted in (13) to an oxidising neutralization by zinc roasted ore (14), for instance in presence of a certain amount (15) of ammonia ions, which results in the precipitation of ammonium jarosite mixed with a certain amount of basic iron sulfate.

This precipitation of iron may be made, for instance in accordance with U.S. Pat. No. 3,434,947 or 3,493,365 or according to other patents or known processes, in the forms of jarosite, goethite or basic iron sulfates, and the secondary leaching may be made according to the methods outlined in U.S. Pat. Nos. 3,652,264,—3,434,7-98—3,434,978—3,493,365 or any other leaching method.

The jarosite slurry (16) obtained after the neutralization step (13) may contain typically 5 to 9% of solids, and it is advantageous to have this slurry settled in (17), in order to reduce the size of the filter which will be used for the final separation of the ferriferous precipitate. The decanted solution (18) of the settler is recycled to the primary leaching. The thickened slurry (19) may have between about 250 and 425 g/l of solids, at operator's preference and according to the quality of the precipitate obtained. Thicker slurries require slightly less filtering area, but necessitate a better and more accurate settling than thinner ones. In order to improve the settling, known flocculants are normally used.

The filter (20) is preferably a rotary tilting pan filter, which comprises essentially a series of filtering cells (21), f.i. 24 cells, arranged in a circular rotating path, a slurry feed distribution device (22), wash liquid distribution devices (23), a filtrate collecting valve or distributor (24), in the center of the filter and connected to all the cells, a cake receiving and removal system (25), located below the cells at a place where all the cells successively are inverted for cake discharge, pressure air supply (26) into the cells for helping cake discharge and wash liquid jets (27) for cleaning the cells thereafter.

Generally speeking the filter is operated in the known manners with however the following requirements:

(a) the filter media of the cells are maintained horizontal within ±1 or 2 mm during the slurry and wash feeds and during the filtrations;
(b) the slurry is distributed substantially evenly all along a filter diameter line above the cell;
(c) the wash liquids are distributed by devices (23) so as to get the cake flooded substantially without any stirring of the cake surface.

Typical operation of the filter is as follows. The set of filter cells are rotated together with a rotating part of the distributor. The feed slurry (19) is distributed into the successive cells passing below the feed device (22) vacuum is applied into the cells through distributor (24) and filtration occurs simultaneously on the cells located within an angle of about 90° of the cell circle, i.e. on about 6 cells, the last one of which just starts to get its upper portion of the cake formed drained of its liquid, the whole of the liquor in the supernatant slurry fed into the cell having been sucked by the vacuum into the cake formed and through the latter into the cell inside and towards the distributor.

At that time, cake wash liquid (28) is flooded onto 6 to 8 cells by devices (23), this wash liquid is sucked through the cake, displacing the slurry liquor which had remained therein, and, thereafter, in 5 to 7 cells the wash liquid is drained from the cake till a liquid content of about 40%, ay which point cracks in the cake begin to appear. Then for an angle of about 5 cells, each cell successively is inverted for cake discharge into collecting means (25), with the help of air back pressure inside the cell (26), then the cell is washed by water sprays (27) from any remnants or heels of cake having stuck on the cell sides or filter medium, and finally the cell is uprighted to the precise horizontal position for a further slurry feed and filtration cycle.

The filtrates of mother liquor (29) and of the washing (30) are recycled to the primary leaching for further zinc recovery.

Using this flow-sheet, the following examples will provide some more detailed information on the operation of the invention.

EXAMPLE NO. 1

The experimental run uses a tilting pan filter as described herein above with 24 cells of which 5 are engaged in the inverting and uprighting operations and all equipped for maintaining the horizontality of the filter medium and of the cake within ±1 mm during the filtering of slurry and wash liquids.

Its central distributor is arranged for collecting separately at operator's discretion the successive filtrates, under a vacuum up to 600 Hg and is also connected to an air blower which causes an air back pressure of up to 150 mm of water gauge successively within each cell, at the time it is inverted for cake discharge.

After stabilization, the details of operation are as follows, figures being referred to a basic filter of 100 m$^2$ of total area which is the average of such filters in commercial use:

filter speed: 5 revolutions per hour=12 min. per revol. (MPR);
total area of the cells: 100 m$^2$=500 m$^2$ loaded per hour;
area of the cells on the portion where they are kept horizontal 79.2 m$^2$ (=9½ minutes of the revolution);
during 2½ minutes, the cell is inverted, the cake discharged, the cell washed, and uprighted again to the horizontal position;
slurry was fed at 80° C. to the filter at a high solid content of 400 g/l and at a rate of 30 liters per m$^2$, i.e. 15,000 liters per hour:
solids: 6,000 kg/hour of jarosite; (absolute volume: 2,200 l.);
liquid: 12,800 liters/hour at 160 g/l of zinc, pH=1.2.
A 15 mm thick cake is formed and its surface appears: the slurry feed and filtration of mother liquor have taken less than 3 minutes;
7,800 liters of mother liquor filtrate at 160 g/l of zinc, pH=1.2 have been collected, and 5,000 liters of mother liquor have remained in the cake;
before the cake is drained from its impregnating liquor, i.e. maximum half minute after the cake surface has appeared (thus avoiding the formation of cracks in the cake),
15,000 liters per hour of wash water at 80° C. (pH=4 to 6) i.e. 2.5 m$^3$ per metric ton of jarosite are distributed onto the cake surface during about 3 minutes of revolution (about 90° of angular revolution. In order not to stir the cake surface two feed systems have been used successfully. A first system was a multitude of spray nozzles, 8 over each of the 6 cells in the wash area, i.e. 48 spray nozzles with a 6 atmospheres pressure, 225 liters per hour, giving each a wide approximately quadrangular solid spray cone of a gentle spray. The second system was a minimum of 3 weir-boxes disposed radially to the filter at 24° angular distance from each other, extending approximately over the width of the cells (dimension along the direction of a radius of the filter). The water overflowed all along the length of the weir-boxes, at about 150 mm above the cake surface and flowed onto the latter over some sort of rubber discharge brattice which was sleighed on the cake surface, thus avoiding to stir the latter;
with the two feed systems displayed, the cakes remained submerged beneath a wash water layer over about 120° of angular revolution, i.e. more than 4 minutes (eight cells "submerged" and the ninth one, downstream, becoming slowly "demerged");
during this period of "submergence", the 15,000 liters per hour of wash water have been systematically pushing out from the cake the 5,000 liters of mother liquor which had remained therein from the slurry filtration;
over about the further 90° or 3 minutes downstream, the water remaining in the cake is partly drained off by the vacuum, until the cake contains about 40% of wash water, at which point it generally starts to develope cracks;
during the washing, filtrates are collected, starting at a pH of 1.2, and rather slowly going up to the pH of about 2 or 2.5, sensibly less than that of the wash water used. The total wash filtrates collected are 5,000 liters of mother liquor mixed with 11,000 liters of water, the pH of the mixture remaining at about 1.6-1.8;

next the cell is inverted, the vacuum inside the cell is replaced by an air back pressure which inflates the filter cloth (filter medium) thus helping the discharge of the cake by gravity and somewhat freeing the cloth pores from solid particles;

still inverted, the cell receives the impacts of a full line of water sprays which wash cloth and cell outer surfaces and the cell then proceeds to uprighting to the original precise horizontal position, ready for receiving the load of slurry for the following cycle. The flow of water sprays is 70 m³/hour and is used in closed circuit with a simple settler for repumping to the sprays. After the wash sprays and before the subsequent slurry loading, it is useful to effect a suction of about 200 mm water gauge in the cell inside to remove remnants of water in the cloth and in the cell;

the discharge cake can be received for removal into a belt or screw conveyor, or it can alternatively be dropped into water sprays and a reslurrying tank with water for removal as a slurry with 10-15% of solids by pumping;

slurry: 15,000 l/hour at 400 g/l solids (=6,000 Kg of solids);

EXAMPLES NO. 2 AND NO. 3

The flows and other conditions of example 1 remaining the same, the speed of the filter was increased to 8 and 4 MPR respectively for example, 2 and 3, (MPR=minutes per revolution), the vacuum rate being reduced from 600 mm Hg to 365 and 235 mm respectively, in order to keep the same rate of draining of the cakes as that of example 1 and so get comparable results.

The results in the cake were as follows:

|  | Ex 1 | Ex 2 | Ex 3 |
|---|---|---|---|
| Cake thickness | 15 mm | 10 mm | 5mm |
| Time/revolution | 12 min. | 8 min. | 4 min. |
| Vacuum | 600 mm Hg | 365 mm Hg | 235 mm Hg |
| Washing time approx. | 4 min. | 2'40" | 1'20" |
| Contents in cake : |  |  |  |
| - soluble Zn | 0.2 | 0.25 | 0.35 |
| - insoluble Zn | 0.6 | 0.55 | 0.52 |
| - total Zn | 0.8 | 0.8 | 0.87 |

Thinner cake and higher speed improve somewhat the insoluble zinc content, but soluble zinc then gets increased.

wash water: 15,000 l/hour=2.5 m³/metric ton of jarosite mother liquor filtrate: 7,800 l/h at 160 g/l of Zn: pH=1.2;

wash filtrates (all mixed): 16,000 l/h at 50 g/l Zn: pH=1.7;

cake: 40% of water=4,000 liters/h, and 6,000 Kg/h of jarosite with about 30% of iron and 12% of sulfur.

Note: (When keeping the high vacuum of 600 mm Hg, with all the other conditions being the same as examples 1 and 2, higher quantities are filtered and washed with similar results when the cake is decreased from 15 mm to 10 and 5 mm respectively).

EXAMPLE NO. 4

The ferriferous zinc sulfate solution (12) of the flow sheet of FIG. 4 has the following composition: 40 g/l $H_2SO_4$; 30 g/l Fe; 80 g/l Zn. In the reaction tanks (13), this solution is neutralized with zinc calcine without excess up to a pH between 2 and 3, $NH_3$ ions having been added in the proportion of 0.7 g of $NH_3$ to 10 g of Fe.

This neutralization causes the precipitation of mainly ammonium jarosite of the formula $(NH_4).Fe_2(SO_4)_2.(OH)_6$. After settling in (17), the clear solution containing about 110 g/l Zn, 5 g/l $H_2SO_4$ and 1 g/l Fe, is recycled to the primary leaching (2) (where pH=4.5 to 5.0).

The thickened slurry (19) is tapped from the settler at the solid concentration of 250 g/l and fed to the same filter as that of examples 1 and 2.

Operation features were as follows:

speed of filter 10 minutes per revolution; (=6 REV per hour);

slurry feed 24,000 l/hour;

solids contained 6,000 kg/hour; (absolute volume 2,200 liters);

cake thickness: 12 mm, - vacuum: 580 mm Hg;

wash liquid feed (single washing but 2 feeds): total 9,600 l/hour; i.e. 1.60 m³ per metric ton of jarosite;

slurry filtration and draining: 9–10 cells;

wash feed and draining: 9–10 cells;

other operating parameters simular to examples 1 and 2.

Results: cake 38% of water (3,680 l/hour); 6,000 kg/hour of jarosite with 30% Fe, 12% S (sulfate), 2% $NH_3$; 0.85% of water insoluble Zn and 0.15% of water soluble zinc;

Solution and wash filtrates together: 27,720 l/hour at 80 g/l Zn, 0.5 g/l Fe, 2 g/l $H_2SO_4$.

This solution was recycled in the process in (13), from where they reached the primary leaching (2) through settler (17).

This jarosite was of a better filterability than the preceeding examples, as it was able to be drained to 38% of liquid before appearance of any cracks.

This fact, coupled with the lower zinc content of the mother liquor enabled to get a lower soluble zinc content (0.15%) despite a lower wash water feed rate.

EXAMPLE NO. 5

With the same slurry at the same rate and the same filter, as in example 1, the quantity of wash water was reduced to 1.875 m³/metric ton of jarosite, but it was passed twice countercurrently with 4 wash feed boxes and on 7 cells instead of six, the filter speed being increased to 8 minutes per revolution for a cake thickness of 10 mm and 4½ cells instead of six were devoted to slurry feed and filtration.

The average result on the cake obtained remained similar to that of the example No. 1.

While specific embodiments of the invention have been shown and described in detail to illustrate the application of the principles of the invention, it will be understood that the invention may embodied otherwise without departing from such principles.

From all the above description and examples it will be understood that the very essence of the invention is the avoidance of the increase of the quantity of insoluble zinc during the operations of filtering and washing, this insoluble zinc being in the latest electrolytic zinc plants which handle ferriferous zinc ores, by far the highest zinc loss in the process.

The invention therefore enables the operator to reach a total zinc content in the iron residue dumped of less than 2% or 1%, whereas with the conventional technique, the content was most generally 3 to 5% or more.

When a sufficient amount of wash water is allowable, it will be preferred to operate single streams of wash water, the same water being distributed over the cake in several portions at successive places.

When a smaller amount of wash water only is allowable into the process, it will be preferred to operate with successive washings arranged countercurrently. Two countercurrent washings will be used for wash water quantities of about 1.5 to 1.75 m³ per metric ton of solids and three countercurrent washings will be preferred if the quantity allowable is lower than 1.5 m³ per metric ton. It will be arranged in the design of the filtration and washing equipment in such a way as to have all successive washing operations, especially countercurrently, completed within a short time, preferably a total of maximum 10 to 15 minutes the shortest time being the best, as with a prolonged time, hydrolysis may begin to appear, if pH becomes higher than 2 or 3. Therefore large vessels should be excluded from the washing circuits.

The filtration of zinc sulfate solution has been specifically referred to ferriferous cakes obtained by precipitation of iron at pH values of 1 to 4, and washed with water; the filterability of the solids being such that washing with thin cakes is obtained within the period of 5 to 15 minutes mentioned. It is a matter of course that the same phenomenon of hydrolysis can occur independently of the nature of the solids filtered and washed, the only condition being that their physical structure is suitable for filtration and washing within the conditions specified. Therefore the invention applies also to filtration and washing of leaching residues and other purification residues of zinc and copper sulfate solutions.

The total quantity of zinc in the cake after washing is less than 1 or 2% only if the insoluble zinc content in the slurry fed to the filter is less than 0.8 respectively 1.8%.

It is not always necessary to provide a decantation of the slurry before filtration. If f.i. no decantation is used it will be sufficient to increase the filtration surface of the filter.

Although, the most appropriate way and best mode of performing the invention is using a continuous operation, the invention may, in certain circumstances, be practiced batchwise and discontinuously.

As to the countercurrent washing, if the quantity of water allowable is sufficient, i.e. 2 to 3 m³/ton, than it could be better not to use countercurrent, as this increases the time of the total washing operations, which may give some begin of hydrolysis if pH is somewhat high. So countercurrent washing is not a main feature of the process according to the invention. It will be useful only if the quantity of water allowable is small and provided the operation time is not too long.

Although different kinds of filtering cloths can be used in the filter it has been found that very satisfying results have been obtained in the washing step with a filtering cloth having the following characteristics:
Nature: polypropylen
Weaving: Satin of 5 with the side to the cake calendered
  monofilament warp-threads
  multifilament weft-threads
Number of threads:
  weft-threads: 1760/meter
  warp-threads: 4000/meter
Weight: 220 g/m²
Tensile strength:
  weft sense: 215 kg.force/5 cm
  warp sense: 200 kg.force/5 cm
Permeability:

According to DIN: 220 liters air/dm² minute under pressure of 20 mm water column.

What is claimed is:

1. A process for the preparation of zinc sulfate solution from roasted zinc bearing ore containing iron which comprises treating said ore in a first stage with sulfuric acid to yield a solution of zinc sulfate mixed with solids containing further zinc sulfate in solution admixed with the solids, adding excess roasted zinc ore to maintain said solution at a pH of about 4 to 5.5, separating the solids from the solution in a second stage by continuously decanting one part of said solution substantially free of solids from the upper portion of a decantation vessel to yield a first solution of zinc sulfate from which zinc is recoverable by further treatment electrolytically, continuously withdrawing the other part of solution rich in solids from the lower portion of said vessel and passing the solution rich in solids to a horizontal plane filter to obtain a filter cake consisting essentially of said solids mixed with further zinc sulfate solution, rapidly washing the filter cake successively with a plurality of continuous countercurrent washings of wash water, separating the zinc sulfate solution from said solids with substantially no hydrolysis insolubilizing zinc in the cake to solid zinc compounds in the filter cake, thus separating and recovering a further solution of zinc sulfate from which zinc is recoverable by further treatment electrolytically.

2. Process according to claim 1, wherein the cake discharged from the filter after washing does not contain more than 1% of total zinc content and not more than 0.25% of water soluble content.

3. Process for purifying an iron containing zinc sulfate solution which comprises precipitating iron from said solution as a slurry in at least one of the following forms at a pH which is maintained lower than 4: basic sulfate, jarosite or goethite; filtering said slurry on a planar horizontal filter and forming a cake on said planar filter; washing the cake directly on the planar filter with water supplied onto the cake without forming a new slurry with washing water and thus freeing the cake from water soluble zinc and copper compounds promptly before hydrolysis thereof insolubilizes said compounds as basic sulfates, whereby the solid residue in the cake does not contain substantially more insoluble zinc content than it contained in the slurry being fed to the filtration, the thickness of said cake on the planar filter being between about 5 and about 15 mm., and the quantity of said washing water being between 1.1 and 3 m³ per metric ton of solids, with a minimum of 125% of the total void of the cake being used.

4. Process according to claim 3, wherein the cake discharged from the filter after washing does not contain more than 2% of total zinc content and not more than 0.5% of water soluble zinc content.

5. A process as claimed in claim 3, wherein the thickness of the cake is comprised between about 5 and about 15 mm, and wherein a quantity of wash water comprised between 1.1 and 3 m³ per metric ton of solids, with a minimum of 125% of the total void volume of the cake, is flooded over the cake surface without damaging the surface thereof, the cake being made substantially free from zinc and copper bearing solution by a displacement washing, without any substantial mixing of the water with said solution, the washing time being kept lower than 10 minutes.

6. A process as claimed in claim 3, wherein the wash water is flooded over the cake without damaging the surface thereof.

7. A process as claimed in claim 3, wherein the filtration cake is formed on a filtering cloth having substantially following characteristics:
Nature: polypropylene
Weaving: Satin of 5 with the side to the cake calendered
monofilament warp-threads
multifilament weft-threads
Number of threads:
weft-threads: 1760/meter
warp-threads: 4000/meter
Weight: 220 g/m$^2$
Tensile strenght:
weft sense: 215 kg.force/5 cm warp sense: 200 kg.force/5 cm
Permeability:
According to DIN: 220 liters air/dm$^2$ minute under pressure of 20 mm water column.

8. A process as claimed in claim 3, wherein the slurry is decanted prior to filtration.

9. Process for purifying an iron-containing zinc sulfate solution using a continuous planar filter, which comprises precipitating iron from said solution in slurry form at a pH which is maintained lower than 4, said iron being in at least one of the following forms: basic sulfate, jarosite or goethite, filtering said slurry on a planar filter and forming a cake on said planar filter, washing the cake directly on the planar filter at least twofold countercurrently without substantially forming a new slurry by mixing any portion of the cake with any of the wash liquids, and thus freeing the cake from water soluble zinc and copper compounds promptly before hydrolysis thereof insolubilizes said compounds as basic sulfates, whereby the solid residue in the cake does not contains substantially more insoluble zinc content than it contained in the slurry being fed to the filtration.

10. Process for purifying an iron containing zinc sulfate solution, which comprises precipitating iron from said solution as a dilute slurry in at least one of the following forms at a pH which is maintained lower than 4: basic sulfate, jarosite or goethite; decanting the so-obtained slurry and thereby obtaining a relatively fluid slurry in the form of an underflow liquid issuing from said decanting; filter said underflow liquid on a continuous planar filter and forming a cake on said planar filter; washing the cake directly on the planar filter with water supplied onto the cake without forming a new slurry with washing water and thus freeing the cake from water soluble zinc and copper compounds promptly before hydrolysis thereof insolubilizes said compounds as basic sulfates, whereby the solid residue in the cake does not contain substantially more insoluble zinc content than it contained in the slurry being fed to the filtration.

11. Process for purifying an iron-containing zinc sulfate solution using a continuous planar filter, which comprises precipitating iron from said solution in dilute slurry form at a pH which is maintained lower than 4, said iron being in at least one of the following forms: basic sulfate, jarosite or goethite decanting the so-obtained slurry and thereby obtaining a relatively fluid slurry in the form of an underflow liquid issuing from the decanting, filtering said underflow liquid on a planar filter and forming a cake on said planar filter, washing the cake directly on the planar filter, at least twofold countercurrently without substantially forming a new slurry by mixing any portion of the cake with any of the wash liquids, and thus freeing the cake from water soluble zinc and copper compounds promptly before hydrolysis thereof insolubilizes said compounds as basic sulfates, whereby the solid residue in the cake does not contains substantially more insoluble zinc content than it contained in the slurry being fed to the filtration.

12. Process for purifying an iron-containing zinc sulfate solution, comprising the consecutive steps of precipitating said iron at a pH lower than 4 as one or more of the following forms: basic sulfate jarosite or goethite; settling the resulting slurry, filtering the underflow from this settled slurry on a plane horizontal filtration surface, and washing the resulting filter cake with water on the same filtration surface by displacement effect in such a manner as to substantially avoid long contact and mixing of wash water with the liquor in the cake, whereby hydrolysis of the zinc and copper sulfates included in the liquor into insoluble compounds remaining in the cake is substantially avoided.

13. A Process as claimed in claim 12, wherein the wash water is passed several times countercurrently through the cake, said amount of water being fed to the last pass and the filtrate of each pass being recycled for the feed of the upstream pass, the total washing time for all the passes being kept lower than 15 minutes.

14. A process for the preparation of zinc sulfate solutions from roasted zinc bearing ore containing iron which comprises leaching said ore in a first stage with sulfuric acid to yield a solution of zinc sulfate mixed with the undissolved solids adding excess roasted zinc ore to maintain said solution at a pH of about 4 to 5.5, separating at least a major portion of the solution so obtained, substantially free of solids to yield a first solution of zinc sulfate from which zinc is recoverable by further treatment electrolytically, withdrawing the solids with any remaining portion of the solution and submitting said solids to a further leaching treatment by sulfuric acid in such conditions that at least a major part of both the remaining zinc and iron of the solids are dissolved, thereafter precipitating the iron from the zinc iron sulfate solution at a pH comprised between 1 to 4, in at least one of the following forms: basic sulfate, jarosite or goethite, separating thereafter the solids by at least passing in a final step a slurry of these solids with at least a part of the sulfate solution to a horizontal plane filter to obtain a thin filter cake consisting essentially of said solids mixed with some remaining zinc sulfate solution, rapidly washing the filter cake with wash water, displacing the zinc sulfate solution from said solids by gravity and differential pressure with substantially no hydrolysis insolubilizing zinc in the cake to solid zinc compounds in the filter cake, thus separating and recovering a further solution of zinc sulfate from which zinc is recoverable by further treatment electrolytically.

15. Process for purifying an iron containing zinc sulfate solution which comprises precipitating iron from said solution as a slurry in at least one of the following forms at a pH which is maintained lower than 4: basic sulfate, jarosite or goethite; filtering said slurry on a planar horizontal filter and forming a cake on said planar filter; rapidly washing the cake directly on the planar filter with water supplied onto the cake surface without damaging the cake surface and without forming a new slurry with wash water, and thus freeing the cake from water soluble zinc and copper compounds promptly within a time short enough to prevent hydrolysis thereof and insolubilization of said compounds as basic sulfates, whereby the solid residue in the cake does not contain substantially more insoluble zinc content than it contained in the slurry being fed to the filtration and the total zinc recovered as water soluble zinc is increased by at least about 1.5% of the zinc content in the ore processed.

16. A process as claimed in claim 15, wherein the thickness of the cake on the filtration surface is between about 5 and about 15 mm; wherein the quantity of wash water is between about 1.1 and about 3 $m^3$ per metric ton of solids, with a minimum of 125% of the total void volume of the cake; and wherein the cake is made substantially free from zinc and copper bearing solution without any substantial mixing of the water with said solution, and the washing time is kept lower than 10 minutes.

* * * * *